United States Patent
Briscoe et al.

(10) Patent No.: US 7,644,123 B2
(45) Date of Patent: Jan. 5, 2010

(54) MESSAGE ANNOUNCEMENTS (75) Inventors: Robert J Briscoe, Woodbridge (GB); Andrea Soppera, Ipswich (GB)

(73) Assignee: British Telecommunications public limited company, London (GB)

( * ) Notice: Subject to any disclaimer, the term of this patent is extended or adjusted under 35 U.S.C. 154(b) by 191 days.

(21) Appl. No.: 10/549,911

(22) PCT Filed: Mar. 23, 2004

(86) PCT No.: PCT/GB2004/001243
§ 371 (c)(1),
(2), (4) Date: Sep. 20, 2005

(87) PCT Pub. No.: WO2004/086253
PCT Pub. Date: Oct. 7, 2004

(65) Prior Publication Data
US 2006/0224683 A1    Oct. 5, 2006

(30) Foreign Application Priority Data
Mar. 24, 2003  (GB) ................................. 0306740.2
Mar. 24, 2003  (GB) ................................. 0306741.0

(51) Int. Cl.
*G06F 15/16* (2006.01)
(52) U.S. Cl. ..................................................... 709/204
(58) Field of Classification Search ................. 709/204; 370/401; 409/207; 705/37
See application file for complete search history.

(56) References Cited

U.S. PATENT DOCUMENTS

| 4,645,873 A * | 2/1987 | Chomet .................... 379/93.12 |
| 5,150,473 A * | 9/1992 | Zulch ......................... 711/162 |
| 5,557,798 A * | 9/1996 | Skeen et al. ................... 705/35 |
| 2003/0174155 A1 * | 9/2003 | Weng et al. .................. 345/700 |
| 2003/0177361 A1 * | 9/2003 | Wheeler et al. ............. 713/176 |
| 2004/0083274 A1 * | 4/2004 | Katiyar et al. ............... 709/217 |
| 2005/0013257 A1 * | 1/2005 | Garyfalos et al. ........... 370/252 |

FOREIGN PATENT DOCUMENTS

| WO | WO 00/36804 | 6/2000 |

OTHER PUBLICATIONS

Liao, Tie. Global Information Broadcast. Jul. 2000. IEEE. pp. 16-25 (1-10).*
International Search Report dated Dec. 17, 2004.
Written Opinion of the International Searching Authority and the International Searching Authority.
Talarian Document "An Overview of the Talarian Product Suite", http://www.talarian.com/industry/middleware/whitepaper.pdf.

(Continued)

*Primary Examiner*—Salad Abdullahi
*Assistant Examiner*—Imad Hussain
(74) *Attorney, Agent, or Firm*—Nixon & Vanderhye P.C.

(57) ABSTRACT

An announcement thread addressing format which comprises a first sub-part concatenated with a second sub-part is described. The first sub-part is preferably the address of the party which generates the addressing identifier, whereas the second sub-part may be random data. An announcer apparatus may then use these address formats by including only those parts of an announcement thread address which render the address unique within the particular index message in which it is to be included, but not necessarily globally unique.

12 Claims, 7 Drawing Sheets

OTHER PUBLICATIONS

Finlayson, Network Working Group, Internet-Draft, Expire in six months, Jan. 1998, pp. 1-38.

Handley et al., Network Working Group, Request for Comments: 2974, Category: Experimental, Session Announcement Protocol (RFC2974).txt pp. 1-17, 2000.

Finlayson, Network Working Group, Internet-Draft, Expire in six months, Jan. 1998.

Handley, Network Working Group, Request for Comments: 2327, Category: Standards Track, Apr. 1998.

Handley et al., Network Working Group, Request for Comments: 2974, Category: Experimental, Oct. 2000, pp. 1-18.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    ATh#_1     |                    Version                    |
+-+-+-+-+-+-+-+-+-+-+-+-+-+-+-+-+-+-+-+-+-+-+-+-+-+-+-+-+-+-+-+-+
|    ATh#_2     |                    Version                    |
+-+-+-+-+-+-+-+-+-+-+-+-+-+-+-+-+-+-+-+-+-+-+-+-+-+-+-+-+-+-+-+-+
|    ATh#_3     |                    Version                    |
+-+-+-+-+-+-+-+-+-+-+-+-+-+-+-+-+-+-+-+-+-+-+-+-+-+-+-+-+-+-+-+-+
|       0       |  AllID length |            SchID              |
+-+-+-+-+-+-+-+-+-+-+-+-+-+-+-+-+-+-+-+-+-+-+-+-+-+-+-+-+-+-+-+-+
|                            AllID...                           |
+-+-+-+-+-+-+-+-+-+-+-+-+-+-+-+-+-+-+-+-+-+-+-+-+-+-+-+-+-+-+-+-+
/                            ...AllID...                        /
+-+-+-+-+-+-+-+-+-+-+-+-+-+-+-+-+-+-+-+-+-+-+-+-+-+-+-+-+-+-+-+-+
|                         ...AllID               |   Padding    |
+-+-+-+-+-+-+-+-+-+-+-+-+-+-+-+-+-+-+-+-+-+-+-+-+-+-+-+-+-+-+-+-+
|    ATh#_4     |                    Version                    |
+-+-+-+-+-+-+-+-+-+-+-+-+-+-+-+-+-+-+-+-+-+-+-+-+-+-+-+-+-+-+-+-+
|    ATh#_5     |                    Version                    |
+-+-+-+-+-+-+-+-+-+-+-+-+-+-+-+-+-+-+-+-+-+-+-+-+-+-+-+-+-+-+-+-+
|       0       |  AllID length |            SchID              |
+-+-+-+-+-+-+-+-+-+-+-+-+-+-+-+-+-+-+-+-+-+-+-+-+-+-+-+-+-+-+-+-+
|                            AllID...                           |
+-+-+-+-+-+-+-+-+-+-+-+-+-+-+-+-+-+-+-+-+-+-+-+-+-+-+-+-+-+-+-+-+
/                            ...AllID...                        /
+-+-+-+-+-+-+-+-+-+-+-+-+-+-+-+-+-+-+-+-+-+-+-+-+-+-+-+-+-+-+-+-+
|    ATh#_4     |                    Version                    |
+-+-+-+-+-+-+-+-+-+-+-+-+-+-+-+-+-+-+-+-+-+-+-+-+-+-+-+-+-+-+-+-+
|    ATh#_6     |                    Version                    |
+-+-+-+-+-+-+-+-+-+-+-+-+-+-+-+-+-+-+-+-+-+-+-+-+-+-+-+-+-+-+-+-+
```

MESSAGE ANNOUNCEMENTS

This application is the U.S. national phase of international application PCT/GB2004/001243 filed 23 Mar. 2004 which designated the U.S. and claims benefit of GB 0306740.2, dated 24 Mar. 2003 and GB 0306741.0, dated 24 Mar. 2003, the entire content of which is hereby incorporated by reference.

TECHNICAL FIELD

The present invention relates to an announcement method and system for use in a publish-subscribe architecture. The present invention also relates to a method and apparatus for allocating an identifier to a sequence of messages, and in particular to such methods and apparatus which are suitable for use in publish-subscribe architectures.

BACKGROUND TO THE PRESENT INVENTION AND PRIOR ART

Publish-Subscribe technologies are known in the art which allow users to monitor for information and the like by listening to known information channels. In our earlier published International patent application No. WO01/99348 we describe a publish-subscribe architecture we term the Generic Announcement Protocol ("GAP"), wherein messages relating to a defined subject are transmitted over communications channels which are listened to by listener applications. That is, GAP, and publish-subscribe technologies more generally, allow users to create channels that relate to a 'subject', which we generalise here to a 'sequence of object versions', which we will term a 'thread'. Usually current approaches such as TIBCO TIBnet or Talarian SmartSockets (see http://www.talarian.com/industry/middleware/whitepaper.pdf) use hierarchical naming trees to identify channels. The hierarchical naming approach does at least ensure each identifier is unique across all the contexts in which any of the object versions may appear, which is an important requirement. But there is also a problem in that the technology must also manage change of how people name subjects (e.g. company names change). With hierarchical naming, a change at any level in the hierarchy is disastrous for all system lower in the hierarchy, because they are usually widely distributed.

A further problem with current approaches is that the name hierarchy also defines the authority to create new names. With current solutions, each enterprise has created its own top for its own hierarchy. However, the way these naming hierarchies have been designed makes them difficult to extend upwards, rather than downwards, leading to difficulty distributing naming hierarchies effectively across enterprise boundaries. Thus current systems are practically limited to deployment within one enterprise. Although pairs of enterprises can work out ways to share a hierarchy and manage new subject creation, this is not scalable to many, changing, arbitrary relationships between enterprises. It only works well if each merger was planned from the start. Also current approaches are designed so that new channels are created by system administrators for an enterprise, not just any user within the enterprise. Because many low-level relationships can exist between enterprises, channel creation is not efficient to control from one department in each enterprise, leading to frustration when what should be purely administrative steps are used as an opportunity to exert political/commercial controls. Current approaches also do not cope well where each enterprise has many relationships with other enterprise system, each of which is regularly changing.

However, if hierarchies are not to be used, we then encounter a new problem that if anyone is to be able to create a channel identifier; they must be assured that it is unique, and preferably with no prior configuration or registration requirements.

Additionally, within indexed announcement schemes such as GAP (referenced previously), there is frequently the problem that channel identifiers are repeated many times within index messages, thus contributing to possible large index messages, and hence reduced bandwidth efficiency.

The invention is intended to address at least some of the above problems.

SUMMARY OF THE INVENTION

The present invention overcomes at least the latter of the above described problems by using an announcement thread addressing format which comprises a first sub-part concatenated with a second sub-part. The first sub-part is preferably the address of the party which generates the addressing identifier, whereas the second sub-part may be random data. An announcer apparatus may then use these address formats by including only those parts of an announcement thread address which render the address unique within the particular index message in which it is to be included, but not necessarily globally unique.

Moreover, the present invention overcomes the other problems by using an announcement thread addressing format which comprises a meaningful part concatenated with a meaningless part. The meaningful part is preferably the address of the party which generates the addressing identifier, whereas the meaningless part may be random data. An allocator method and apparatus is therefore provided which acts to generate such announcement thread identifiers (AThIDs), and to allocate them to channels as appropriate.

In view of the above, from one aspect there is provided an announcement method for use in a publish-subscribe architecture, the method comprising: compiling an index message containing a plurality of sequence identifiers respectively identifying a plurality of sequences of messages, each message in each sequence relating to substantially the same subject matter; and transmitting the compiled index message onto an index channel; the method being characterised in that the sequence identifiers comprise at least two sub-parts, and the compiling step further comprises, for any sequence identifier to be included within the index message, including within the index message only those sub-parts of a sequence identifier which are necessary to uniquely identify the sequence identifier from the other sequence identifiers included within the message.

The first aspect has the advantage that only those sub-parts of a sequence identifier which are required to identify the sequence identifier within the index message (i.e. relative to the other sequence identifiers in the index message) are included in the index message, thus shortening the length of the index message and improving bandwidth efficiency.

In a preferred embodiment, the first aspect further comprises the step of requesting the allocation of a sequence identifier from an allocator; and receiving a message from the allocator containing the requested sequence identifier. This allows fro allocation of sequence identifiers to be performed by a third party.

From another aspect there is provided a method of allocating a sequence identifier to a sequence of messages relating to substantially the same subject matter and which are to be transmit onto one or more communications channels, the method comprising:

generating a meaningless sequence identifier part;

combining the generated meaningless identifier part with a meaningful sequence identifier part to provide the sequence identifier; and allocating the sequence identifier to the sequence of messages;

wherein the meaningless sequence identifier part is generated such that when combined with the meaningful sequence identifier part the resulting sequence identifier is unique at least at that time, and wherein when the messages in the sequence are subsequently transmit, the identifier is at least partially incorporated therein so as to identify the sequence.

Preferably, a first sub-part of a sequence identifier is a network address or other network locator. This allows for the degree of permanence required in the identifier, whilst allowing for a degree of control to be retained with the allocating party.

In an embodiment the first sub-part is preferably a Universal Resource Locator (URL). This provides advantages in sequence identifier allocation due to the feature of a URL that it can represent both a process (e.g. a HTTP daemon) and persistent data stored on a machine. It can also be used to represent a programme dedicated to AThID allocation, which can be accessed through the generic process serving all URLs of that scheme, using techniques such as the common gateway interface (CGI).

Alternatively, the first sub-part may be an email address. This provides advantages that it is easy for a human operator to remember.

In other embodiments of the invention the first sub-part is an Internet Protocol network address. This provides advantages in allocation in that most network entities are already allocated with IP addresses, and hence such an allocation scheme would be easy to implement.

Moreover, in embodiments of the invention a second sub-part of the sequence identifier is preferably a number, and furthermore is preferably randomly generated. The use of numbers allows for convenient generation by a computer or other machine.

n a preferred embodiment, the number used as the meaningless part of the sequence identifier is produced by applying a hash function to data defining the subject matter of the sequence of messages. This provides a link via the hash function between the actual definition of the subject matter of the sequence of messages and the resulting number, such that if a new sequence identifier is required for different subject matter (i.e. the subject matter has been newly defined), a new number will be obtained as a result of the hash of the new definition.

In a preferred embodiment there is further included the step of checking if the generated meaningless part of the sequence identifier has been previously generated, and if so generating another meaningless sequence identifier part; wherein the checking and generating steps are repeated until a meaningless sequence identifier part is obtained which has not been previously generated. This ensures that the resulting obtained sequence identifier is unique across the present usage space.

Additionally, preferred embodiments of the invention preferably further comprise the step of receiving a request for a sequence identifier, the allocating step then further comprising transmitting the subsequently obtained sequence identifier to the party or element from which the request was received. Such functionality allows for third parties with possibly unstable contexts themselves to request and obtain sequence identifiers from a possibly more stable identifier allocator.

From a further aspect, the invention also provides an announcement method for use in a publish-subscribe architecture, the method comprising: transmitting a sequence of messages relating to substantially the same subject matter on to one or more communications channels, the method being characterised by including in each message at least part of a sequence identifier, the sequence identifier having been allocated to the sequence as described above.

Additionally, from a yet further aspect there is also provided an announcement method for use in a publish-subscribe architecture, the method comprising transmitting an index message onto an index channel, the index message containing one or more sequence identifiers respectively identifying one or more sequences of messages, each message in each sequence relating to substantially the same subject matter, the method being characterised in that the sequence identifiers are respectively allocated to the sequences of messages as previously described.

From another aspect there is provided an announcement system for use in a publish-subscribe architecture, the system comprising: message compiling means arranged in use to compile an index message containing a plurality of sequence identifiers respectively identifying a plurality of sequences of messages, each message in each sequence relating to substantially the same subject matter; and means for transmitting the compiled index message onto an index channel; the system being characterised in that the sequence identifiers comprise at least two sub-parts, and the message compiling means is further arranged to operate, for any sequence identifier to be included within the index message, to include within the index message only those sub-parts of a sequence identifier which are necessary to uniquely identify the sequence identifier from the other sequence identifiers included within the message.

A further aspect also provides an apparatus for allocating a sequence identifier to a sequence of messages relating to substantially the same subject matter and which are to be transmit onto one or more communications channels, the apparatus comprising:

identifier part generation means for generating a meaningless sequence identifier part;

sequence identifier generation means arranged to combine the generated meaningless identifier part with a meaningful sequence identifier part to provide the sequence identifier; and sequence identifier allocating means for allocating the sequence identifier to the sequence of messages;

wherein the meaningless sequence identifier part is generated such that when combined with the meaningful sequence identifier part the resulting sequence identifier is unique at least at that time, and wherein when the messages in the sequence are subsequently transmit, the identifier is at least partially incorporated therein so as to identify the sequence.

Within these further aspects the corresponding advantages and further features may be obtained as already described above in respect of the first aspect and second aspect respectively.

From another aspect, the present invention further provides a computer program or suite of programs so arranged such that when executed by a computer system it/they cause/s the system to perform the method of any of the above described aspects. The computer program or programs may be embodied by a modulated carrier signal incorporating data corresponding to the computer program or at least one of the suite of programs, for example a signal being carried over a network such as the Internet.

Additionally, from a yet further aspect the invention also provides a computer readable storage medium storing a computer program or at least one of suite of computer programs according to the aspect described above. The computer readable storage medium may be any magnetic, optical, magneto-optical, solid-state, or other storage medium capable of being read by a computer.

BRIEF DESCRIPTION OF THE DRAWINGS

Further features and advantages will become apparent from the following description of an embodiment of the invention, presented by way of example only, and by reference to the accompanying drawings, wherein.

DESCRIPTION OF THE EMBODIMENTS

An embodiment of the invention will now be described with respect to FIGS. 1 to 7.

Figure 1:
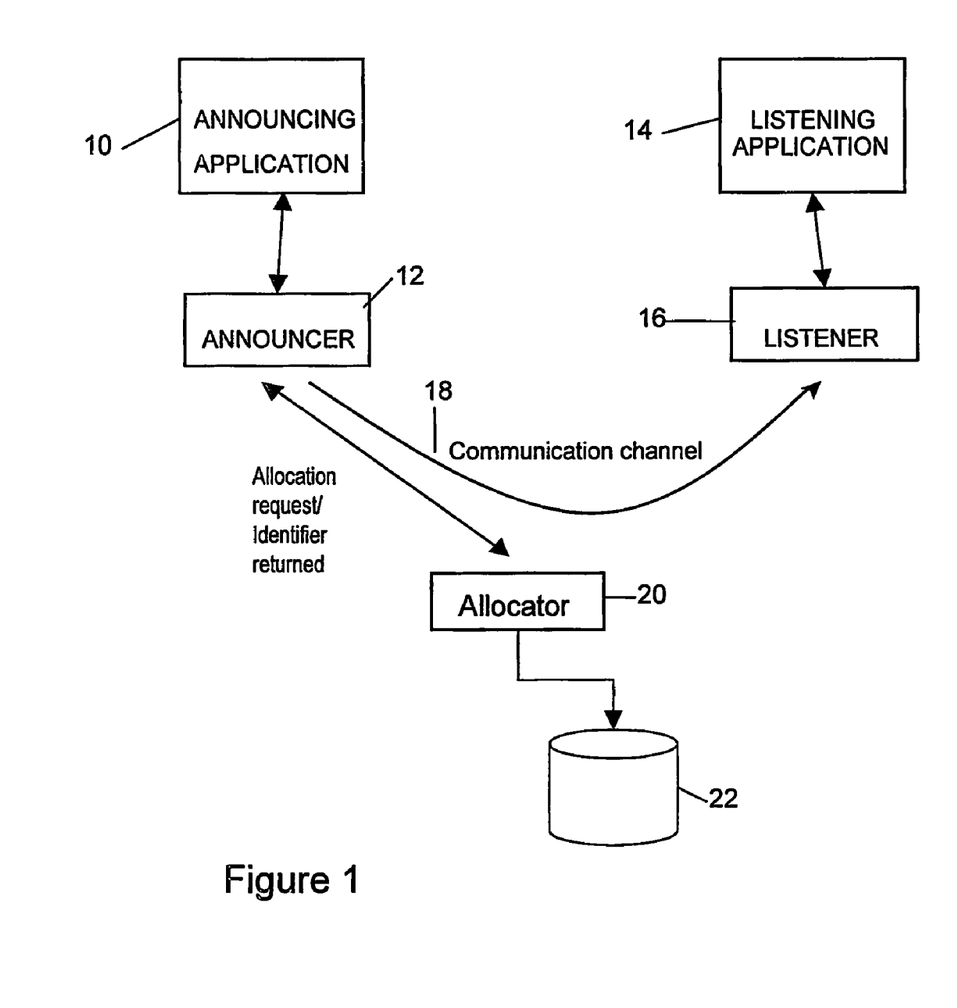
FIG. 1 is a system block diagram of the general system architecture in which the invention is intended for use.

FIG. 1 illustrates a publish-subscribe architecture which constitutes the operating environment of the present invention. This will be described next, and the terminology to be used herein defined thereby.

In FIG. 1 an announcing application 10 is provided running on a computer system or the like (not shown). The announcing application operates to generate or otherwise process information which is to be announced by transmission of a message (an announcement) relating to a predefined subject onto a communications channel 18. The scope of the operation of the announcing application 10 as used herein is deliberately broad, as the announcing application could be any application which produces information relating to any characteristic of any sort of entity. As examples, an announcing application 10 could be installed on a temperature sensor, and which acts to periodically announce the temperature sensed by the sensor. In another example, the announcing application could be located as part of the system of a stock exchange, and act to announce the share price of a particular share, or the index level of a stock index. In another application, the announcing application could be used in a distributed programming environment to track the value that an internal variable to a program takes, and to produce information relating to the value of that variable.

The announcing application 10 communicates with an announcer 12. The announcer 12 is a software programme forming part of a communication middleware that is given information by other locally running programmes (i.e. the announcing application 10) to announce information globally but efficiently to any interested parties by virtue of the transmission of messages onto the communications channel 18. 'Locally' here usually means on the same computing device, but an announcer 12 may be arranged on one device to act for a number of locally connected devices.

Additionally provided as part of the publish-subscribe architecture is a listener 16. The listener 16 is another software programme which forms part of the communication middleware. It receives the messages sent by the announcer 12 on the appropriate communications channels 18. The listener 16 acts to communicate with a listener application 14, which is the application which makes use of the information provided by the announcing application 10. Thus, continuing the examples given above, the listening application 14 could be an industrial control application which acts to control an industrial process in response to the temperature sensed by the temperature sensor, and communicated to the listener 16 in a message from the announcer 12.

It should be noted here that the announcer 12 and listener 16 are completely decoupled, which means that the announcer 12 does not need to have any information about the identity, the credentials and the number of listeners.

When the announcing application 10 continually updates and produces new information relating to the data, object or entity to which it relates at each update a new announcement message is created and transmitted by the announcer 12. We define such a sequence of related announcement messages to be an "announcement thread", with each individual message in the sequence being an "announcement version". A new version of an announcement (an announcement version) is assumed to contain information related to previous versions in some way specific to the application making the announcements.

An announcement message is therefore a new announcement version of an announcement thread, and could occur at any unknown time in the future. The new announcement version expresses an update of specific information relating to the data, objects, or entities which the announcing application is monitoring.

Within such an architecture there is a clear need to be able to identify announcement threads, being the sequence of messages transmit onto the communications channel 18. This is so listeners can receive an announcement message and know to which thread the announcement message relates and thereby determine the subject matter of the message. Usually, the subject matter of an announcement thread will have been defined in advance.

Figure 2:
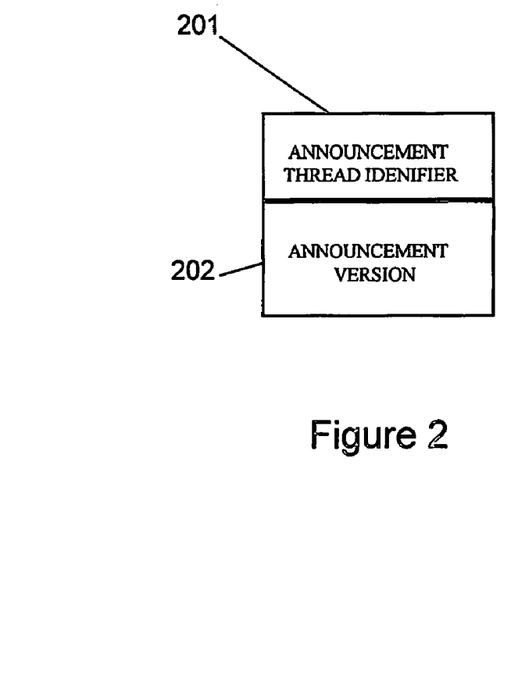
FIG. 2 illustrates an announcement message format used by the announcement system in which the invention is used.

Therefore, in order to allow such identification, each announcement thread is provided with an announcement thread identifier (AThID), which is the globally unique identifier for an ANNOUNCMENT THREAD. Within an announcement message, both the announcement thread identifier 201 and the announcement version 202 (usually a numeric value) are included, as shown in FIG. 2.

In order to provide for globally unique AThIDs, an allocator 20 is provided. An allocator 20 is an entity that creates AThIDs for every new announcement thread at the request of an announcer 20. The allocator 20 is therefore arranged to communicate with the announcer 12, usually over the communications channel 18. The allocator 20 is preferably a software application running on a host computer system, but could in some embodiments be a human.

Note here that the allocator 20 and the announcer 12 are completely decoupled. An allocator 20 and an announcer 12 communicate together only for the creation of a new AThID.

For use within such an architecture, an AThID must have certain properties. Firstly, an AThID should be globally unique across all the spaces where it may eventually become relevant. This is because the identifier may become relevant to a context that did not exist when the identifier was created. Allowing listener mobility is enough to require global uniqueness.

Secondly, preferably such AThID's should not be subject to a hierarchical registration scheme. An obvious solution to the problem of AThID allocation would be to create unique identifiers by registering them with a hierarchical registration system with a single global root. However, open systems that allow people and programmes to create new objects autonomously are preferable over those requiring registration. Even where registration is delegated hierarchically, creation of the hierarchy becomes an obstacle to immediate use of the system. Also, a registration hierarchy is often perverted into a permission hierarchy by those that control it. For these reasons we do not favour such registration schemes.

A third factor to be considered is the stability of the AThID. If we reject uniqueness by registration, an alternative is to allocate identifiers that are only unique to a pre-existing unique identifier of the allocator, then concatenate the two. However, by doing this, we are making the identifier relative to one of its parent contexts. But, because every set of objects exists in multiple contexts, we then have to guess which parent context is going to outlive all the others. Therefore, we have to carefully choose which pre-existing unique identifier to use, to ensure it will rarely be in a context that may die before its children.

Additionally, an AThID must be designed in a simple manner so that they can be used efficiently with application such as HTTP, SNMP, LDAP that use an ASCII representation so an ASCII scheme is required.

In order to meet the above requirements, in the present invention we propose a preferable ASCII representation for an absolute AThID, and which consists of three mandatory parts concatenated together with the identifiers and separators as shown below:

"ath:" <Scheme id> "=" <Allocator id> "$" <Announcement thread number>

We also present a corresponding binary representation, but this will be described later.

Within the ASCII representation the prefix "ath:" indicates that the string is an AThID, and the following string gives the scheme ID. The scheme ID indicates to the listener which receives a message containing such an AThID what the format of the rest of the AThID will be, and in particular what form the Allocator ID field (AllID) will take. We present a number of possible schemes below, and recommend one of them. However, for future proofing, we still include the ability for new allocation schemes to be introduced by including the scheme identifier in every full AThID.

Following the Scheme ID field is an "=" sign, after which the Allocator ID is included. This is an identifier or address code which uniquely identifies the allocator 20 which generated the AThID. This is the meaningful part of the AThID, as it indicates to a recipient who the allocator 20 was which generated the AThID. The format of the AllID will depend on the scheme, which as mentioned will be described.

Following the AllID is a "$" symbol, after which there is included an announcement thread number field. The announcement thread number (ATh#) may be any integer in the range 1-65535. ATh#=0 is reserved (for reasons only relevant when we introduce the binary representation). We do not allow textual ATh#s to avoid the emotional or commercial attachments people would otherwise carry for certain names.

For efficiency of other parts of the system, particularly binary index representations (see later), allocation of ATh#s must not bias towards any specific value.

Therefore, allocation of announcement thread numbers is preferably random within the available number space, and hence the actual number chosen carries no meaning.

Moreover, it will be appreciated that in other embodiments numbers may be replaced with letters, or with alphanumeric sequences.

In the preferred embodiment lower case insensitive text strings are used to represent each scheme ID in the ASCII representation of an AThID (see the column headed SchTx in Table 1 below). The binary scheme identifier may be any of 0-15 but we only use one code point (1) from the 16 in this space for our recommended scheme, as will be described. We would expect new scheme identifiers (both their binary and ASCII representation) to be registered by the Internet Assigned Names Authority (IANA).

Similarly, the new "ath:" URI scheme will need to be registered with IANA.

Some candidate schemes for allocator IDs are given in Table 1. All but a couple of the candidate allocator identifier schemes use pre-existing identifiers that are already unique.

TABLE 1

Candidate allocator identifier schemes

| SchID | SchTx | Binary width/b | Description | Notes |
|---|---|---|---|---|
| — | IPv4 | 32 | IPv4 addr of allocator | |
| — | IPv6 | 128 | IPv6 addr of allocator | |
| — | MAIL | var | E-mail address of owner of allocator | |
| 1 | URL | var | URL of allocator | |
| — | IANA | ? | IANA assigned allocator id (hierarchical) | |
| — | GAP | ? | Allocator id claimed on well-known GAP channel | |

A first possible scheme is the use of an IP ADDRESS SCHEME. This scheme uses an IP address as an allocator ID and is very easy to set up. However to be effective it requires that the (possibly many) operators of that machine remember which AThIDs have been allocated under that allocator id. Otherwise it is possible that a new operator might not be told that the machine had a set of AThIDs associated with this IP address. That means that different operators could use a similar AThID for different purposes.

An alternative scheme is the MAIL SCHEME. This scheme uses an individual's email address as an allocator ID. However an email address is not a very stable allocator and it could be changed and taken from an allocator without the allocator's control. This suggests using a neutral address like AThIDmaster@macdonalds.farm.com, but still leaves the problem of name changes.

A third possible scheme is a URL SCHEME. This scheme uses a uniform resource locator (URL) as an AThID allocator id. The neat feature of a URL is that it can represent both a process (e.g. a HTTP daemon) and persistent data stored on a machine. It can also be used to represent a program dedicated to AThID allocation, which can be accessed through the generic process serving all URLs of that scheme. Therefore, an allocator identifier can be chosen with a likely persistence that should outlive all the AThIDs it will allocate. A human allocator (if used) is not limited to choosing an allocator identifier under her control and therefore in a transient context. For instance highly persistent organisations can set up a simple AThID allocator programme accessible through their CGI.

Therefore, we recommend the URL scheme because a URL can be as stable or as volatile as required, and no-one is restricted to only use URLs within their own contexts, because URLs can be made available to anyone from anywhere on the Internet. An example AThID using our recommended URL scheme for the allocator identifier would look as follows:

<ath:URL=http://www.hosting.org/AThID?set=farm$31425>

Note that an AThID contains a URL when using the URL scheme for the allocator id, but it is not strictly a URL itself—it is a uniform resource identifier (URI), meeting all the definitions and requirements of a URI. An AThID URI doesn't locate information. Rather, an AThID is used indirectly to reference configuration information that locates object versions in both space and time, even though announcement timing is unknown in advance. On this basis, one might argue that most resource locators do not directly locate their resource either, nor do they contain sufficient information to locate it indirectly either. For instance, an HTTP URL does not usually locate information directly; if it contains a hostname it relies on configuration information in a DNS. An HTTP URL doesn't even contain the IP address of any DNS resolver even though it depends on one. However, we can still say that an HTTP URL is a locator, because it only relies on static configuration information that is not unique to the resource being located. An AThID, on the other hand, is not a locator, because it relies on further configuration information specific to the resource in question. Thus, an AThID is an identifier, only locating a resource when used as the key into to a local database of configuration information collected earlier. Nevertheless, we have chosen to ensure that the syntax we define for an AThID meets all the requirements for a URL, because the motivation for most of these requirements is unchanged whether dealing with identifiers or locators.

Where a number of AThIDs appear within one context (e.g. a list), to avoid repetition of similar material, we can define a RELATIVE ATHID. For instance, if the context had already defined the base URI as <ath:URL=http://www.hosting.org/AThID?set=farm> then the relative URI <$31425> would suffice to specify the above absolute AThID. Even if the base URI had a different ATh# appended, the new relative URI would supersede it, as specified in the rules on parsing relative URLs in RFC1808 (as updated by RFC2368 and RFC2396) (assuming again that the motivations for relative URL rules are unchanged for URIs). Note that an AThID without an ATh# appended is invalid.

Within our ASCII representation "ath:" is the URI's scheme name, and is also optional for a relative AThID. But if the allocator identifier is present, it must be preceded by its own allocation scheme identifier (e.g. "URL="). The allocator identifier deliberately does not start with a "//" signifying that there is no network location and we are not using generic resource locator syntax, preventing further processing as a relative URL. However, the URL used for the allocator identifier may itself be relative to a base URL, if and only if the context of the relative URL of the allocator identifier is clearly distinguishable from the context of the whole AThID URI.

When the optional "ath:" prefix isn't present, the resulting relative AThID bears a passing similarity to the URL of a non-AThID scheme. However, a valid URL would start with "URL:" not "URL=". Because of this potential ambiguity, this relative form must only be used in contexts where only an AThID would be expected by human users.

Having described the ASCII representation of our preferred AThID format, we now describe a binary representation.

The proposed binary representation of an absolute announcement thread identifier (AThID) is similar but not the same as the ASCII representation. One difference is that the context in which binary representations will be used make any prefix like "ath:" redundant. A binary AThID consists of three parts concatenated together (we use '|' to represent concatenation):

<Scheme id> | <Allocator id> | <Announcement thread number>

Here, the ANNOUNCEMENT THREAD NUMBER (ATh#) is a 16 bit integer. ATh#=0 is reserved. Additionally, the SCHEME ID is a 4 bit integer, with only one code-point defined, SchID=1 meaning the URL scheme already recommended above, as shown in the 'SchID' column of Table 1.

The form of the allocator identifier depends on which scheme identifier is used. Clearly, if the IPv4 or IPv6 schemes were used, the allocator identifier would simply be the 32 or 128 bit IP address respectively. For the URL scheme, the allocator identifier is just the string of octets that are identical to the ASCII allocator id.

Figure 5:
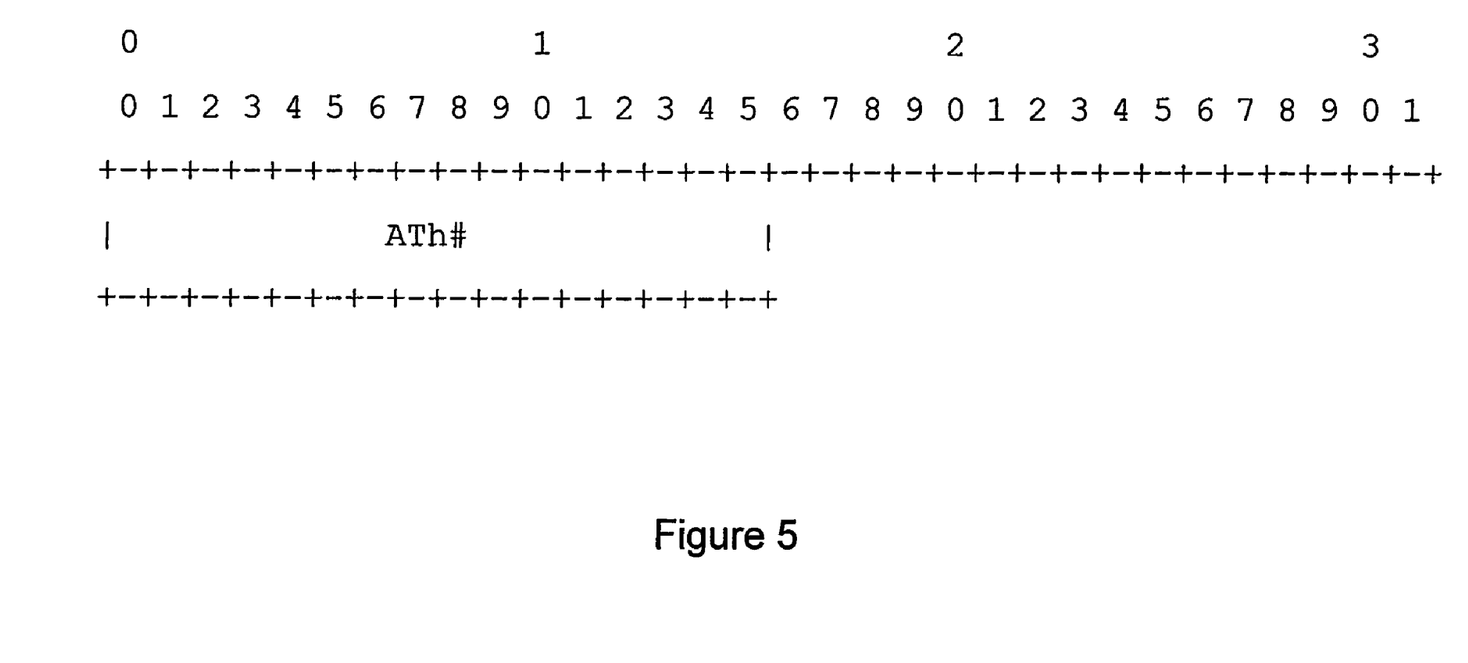
FIG. 5 illustrates a relative sequence identifier provided by an embodiment of the invention.

Relative binary AThIDs as described above would be expected to be extremely common. They must only consist of the ATh# alone, resulting in a simple binary representation as shown in FIG. 5. Here it will be seen that only the 16-bit ATh# is given.

The above definitions of the AThID parts do not give any clue as to the bit width of an absolute binary AThID, unless the scheme identifier implies a fixed width allocator id (such as in the case of the IPv4 or IPv6 allocator ID schemes). Therefore, we recommend using the representation convention shown in FIG. 6 for binary AThIDs in protocols, and in particular in binary announcement messages.

Figure 6:
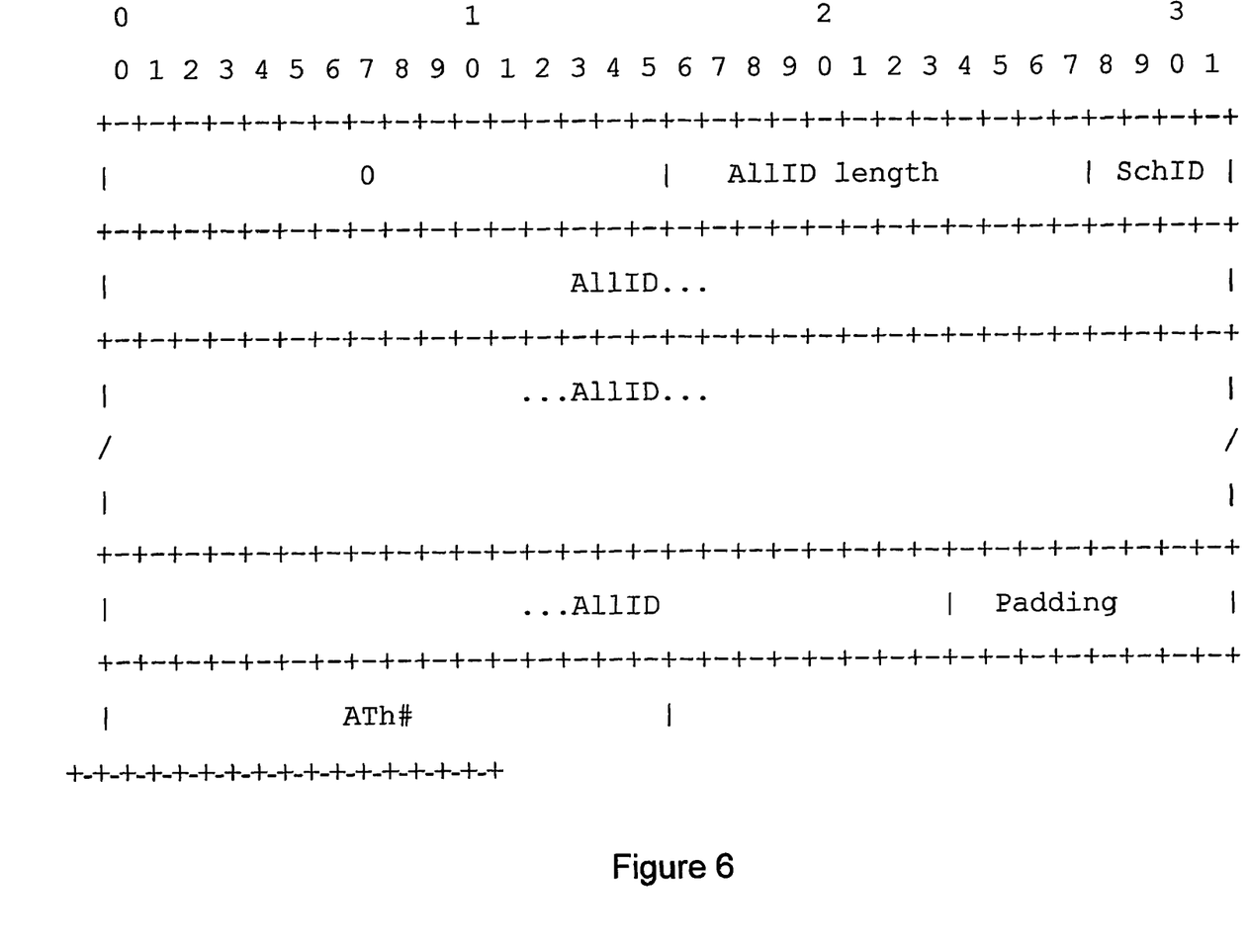
FIG. 6 illustrates the binary format of a sequence identifier provided by the embodiment of the invention.

Within FIG. 6 the leading 16 bits of zeroes allows an absolute AThID to be distinguished from a relative one (recall that zero is a reserved value for the ATh#). The 12 bit AllID length field gives the length of the AllID field in 32 bit chunks, making the maximum allowable allocator ID 16,384B (for efficiency, it would be wise to keep the length as short as possible. Also, although there is no specified limit to URL length, in practice most URL handling software has a limit. Very early versions of some Mosaic-derived browsers had a 256 character URL limit, while Microsoft Internet Explorer (v5.5 at least) has a limit of 2,083 characters. Server software may also be limited, although Apache can handle up to about 8 kB URLs). For AllIDs that do not require a whole multiple of 4 octets, the remnant is padded with zeros. All ASCII allocator identifier schemes should not allow the null character. The AllID length field is redundant if SchID implies a fixed width allocator id, but it saves knowledge of new scheme ids having to be embedded in protocol parsers.

The binary AThID convention set out above inescapably means that the width of a binary AThID is unpredictable without reading the first word, parsing it, then reading the second word if necessary, then parsing that too. However, given that this is an application layer protocol, we are concerned about performance issues, because index announcements are processed very repetitively but we need not be concerned beyond a certain point.

Figure 7:
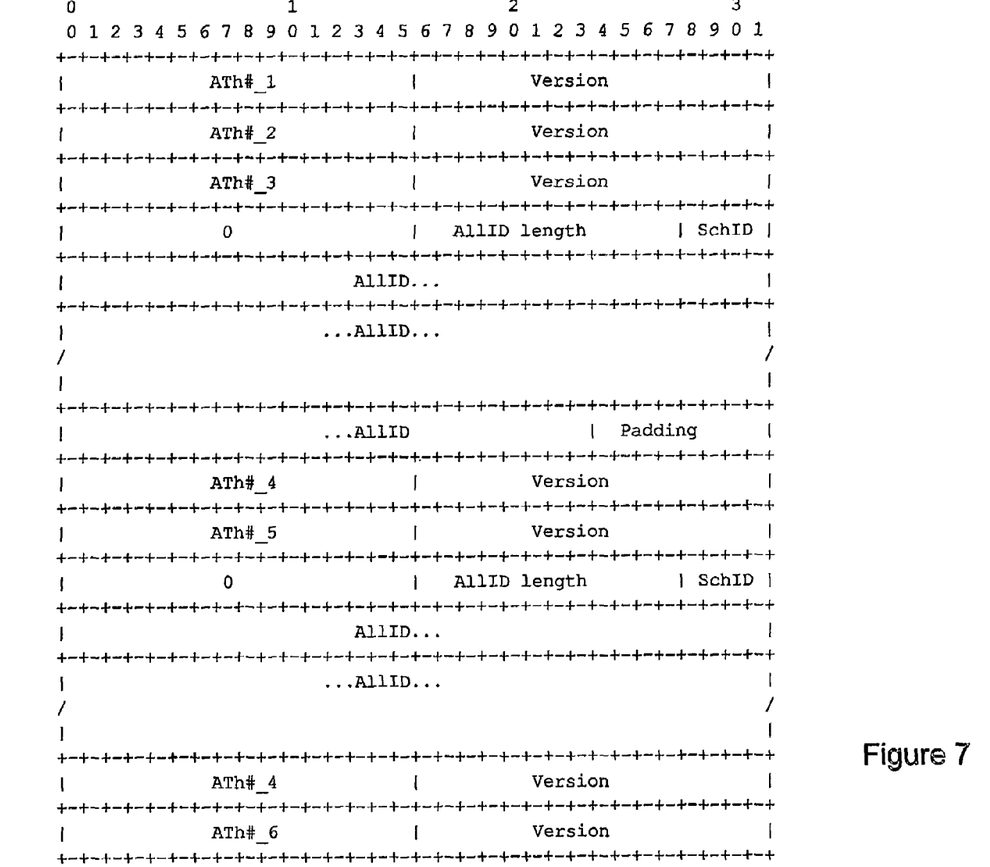
FIG. 7 illustrates how several sequence identifiers may be combined into a single index announcement message in an embodiment of the invention.

We now give an example of the use of this binary representation in an index announcement message, with reference to FIG. 7 which shows the binary layout of the payload of such a message. An index announcement message is simply a table of AThIDs against their respective version numbers, which are 16 bit integers. Index announcement messages as used in the context of the GAP publish-subscribe system are described in our earlier International patent application WO01/99348, as referenced earlier, the contents of which necessary for understanding the format and use of index announcement messages being incorporated herein by reference.

Within an index announcement message each AThID may well have a different allocator ID, but relative AThIDs may be used nearly all the time, because each listener of the index has been previously told that the absolute AThID they are interested in will be in specific index announcement on a specific channel. Therefore, as long as it is unique within the index, each ATh# will imply the absolute AThID that ends with that ATh#. Therefore, all the index announcer has to do is include the absolute AThID for any pairs of AThIDs that happen to have identical ATh#s. Thus the payload of an index announcement might look as shown in FIG. 7.

Here, Ath#_4 would appear twice, so the announcer qualifies both occurrences of it with the full, absolute AThID specification. For all the other AThIDs (1-3,5,6) the short, relative AThID is sufficient.

If it became necessary to continually repeat an allocator ID because of a clash, it would be possible to define an abbreviated symbol for it, as is done in XML namespaces. In a way, this is similar to the internal symbols used when compressing data.

Figure 8:
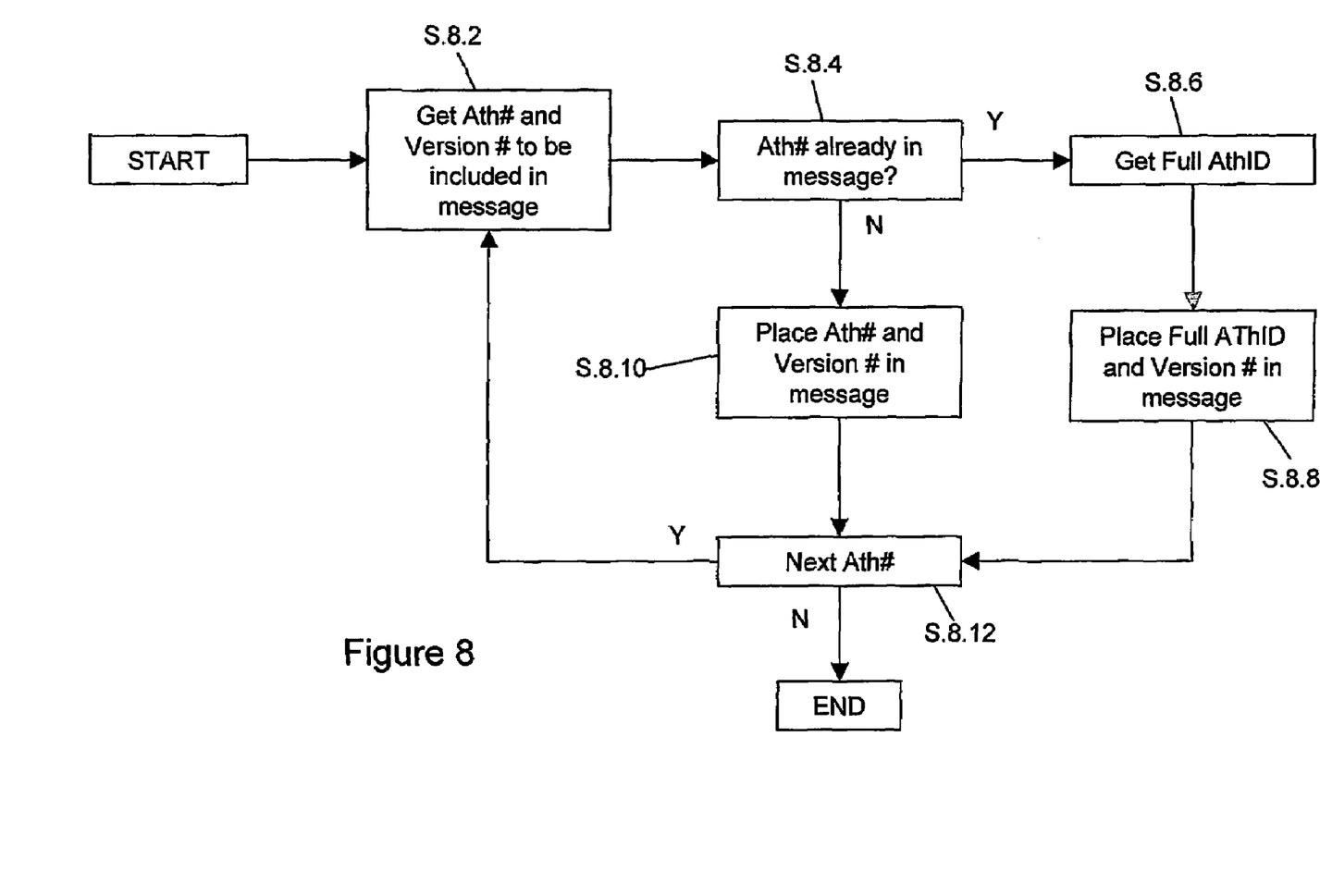
FIG. 8 is a flow diagram illustrating the operation of an announcer in an embodiment of the invention when using the sequence identifier format presented herein.

FIG. 8 illustrates an example process to allow an announcer 12 in a publish-subscribe system architecture such as that shown in FIG. 1 to perform the above described operation using relative AThIDs to reduce the size of index messages.

Firstly, imagine an announcer 12 is to compile an index message for transmission on the communications channel 18. The announcer 12 will have been in contact with one or more announcing applications 10 and will have received indications from them that a respective announcement for those applications is required. Preferably, an announcing application 10 passes announcement information to the announcer 12 regarding the AThID and version number for each announcement which it requires. The announcer 12 receives this information from each announcing application which it serves and stores it for use when compiling a new index message.

In order to compile a new index message the process shown in FIG. 8 may be used. Here, first of all the announcer 12 retrieves the stored information regarding those AThIDs and version numbers for which announcements must be made at step 8.2. Then, at step 8.4 for each retrieved AThID and version number a check is performed to see if the Ath# of the AThID is already in the index message. If not then it is determined that the Ath# itself will be sufficient to identify the announcement thread within the index message without any further information being required, and hence processing proceeds to step 8.10, wherein the Ath# and the version number from the AThID are placed into the payload of the index message (see FIG. 7). Then, processing proceeds to step 8.12, wherein it is determined whether or not there are any further announcements to be placed in the index message payload, and if so then processing proceeds back to step 8.2, and the procedure begins again. Essentially, step 8.12 causes the process to be repeated for every announcement which the announcer has buffered and waiting announcement.

Returning to step 8.4, if it is determined here that an Ath# is already within the payload of the index message being compiled then it will be necessary to include further information relating to the AThID of the announcement to be included within the message, if the announcement is to be capable of unique identification. Thus, if this is determined to be the case at step 8.4 then processing proceeds to step 8.6 wherein the full AThID of the announcement is obtained from the announcer's local memory store, and at step 8.8 the full AThID is then placed within the index message payload. Processing then proceeds to step 8.12, wherein the evaluation as to whether all of the announcements have been included in the message payload is made, as described above.

Following the procedure outlined above, the full AThID is only used in the announcement message when it is necessary because an announcement with the same ATh# as an announcement to be included in the index message is already present therein. At other times, only the ATh# is used, thus resulting in a much reduced payload within the index message than would be the case if the full AThID were to be used for every announcement.

Having described the AThID format provided by the present invention, and also the operation of an announcer when using the format, we now describe the operation of an allocator program which is able to perform the task of the allocator 20 in the architecture described above.

A managed allocator programme could be very rudimentary. It would only need parameters that allowed a user (i.e. an Announcer 12) to perform the following functions:

i) Register new AThIDs (respecting the above requirement that the choice of ATh#s is not biased to certain parts of the number space);

ii) Unregister an existing AThID (see later); and iii) There may also need to be methods to create and destroy sets of AThIDs (e.g. the set 'farm' in the example above).

An allocator programme might optionally support association of textual strings with AThIDs as they are created, in order to provide human-readable descriptions of announcement threads. We will discuss the association of a textual string to an AThID (XML file) in the example operation given below.

Returning to FIG. 1, imagine that the announcing application 10 requires a new AThID. In such a case a request for a new AThID will be made from software associated with the announcing application, to the allocator 20.

In order to do this, within the described embodiment the announcing application generates a human readable description of the information to be announced. This is a description of the subject matter of the announcement thread to which the desired AthID will be applied. The description could be a simple .txt file or a .doc file etc. However our suggestion is to use the extensible Markup Language (XML). We use XML because it offers a unique combination of flexibility and simplicity by both humans and machines.

An example human-readable description of the information XML file is given below:

```
<?xml version="1.0" standalone="yes"?>
<HEADER><HEADLINE>GAP Announcement</HEADLINE>
</HEADER>
<FROM>alice@company.com</FROM>
<DATE>Feb. 2, 2003</DATE>
<ITEM>
<DESCRIPTION>Standard version for 3G protocol release 3.0
</DESCRIPTION>

<VALUE> 123986 </VALUE>

</ITEM>
```

The description of the announcement thread is contained in the sections marked <DESCRIPTION> </DESCRIPTION>, whereas the section marked<VALUE> represents a random number that is used to generate different ATh#. If two announcement threads with different descriptions were to be given the same Ath#, then the random value is changed by the allocator 20 in order to maintain the uniqueness of the ATh#. The announcing application 10 generates a random number simply for data handling process reasons.

Figure 3:
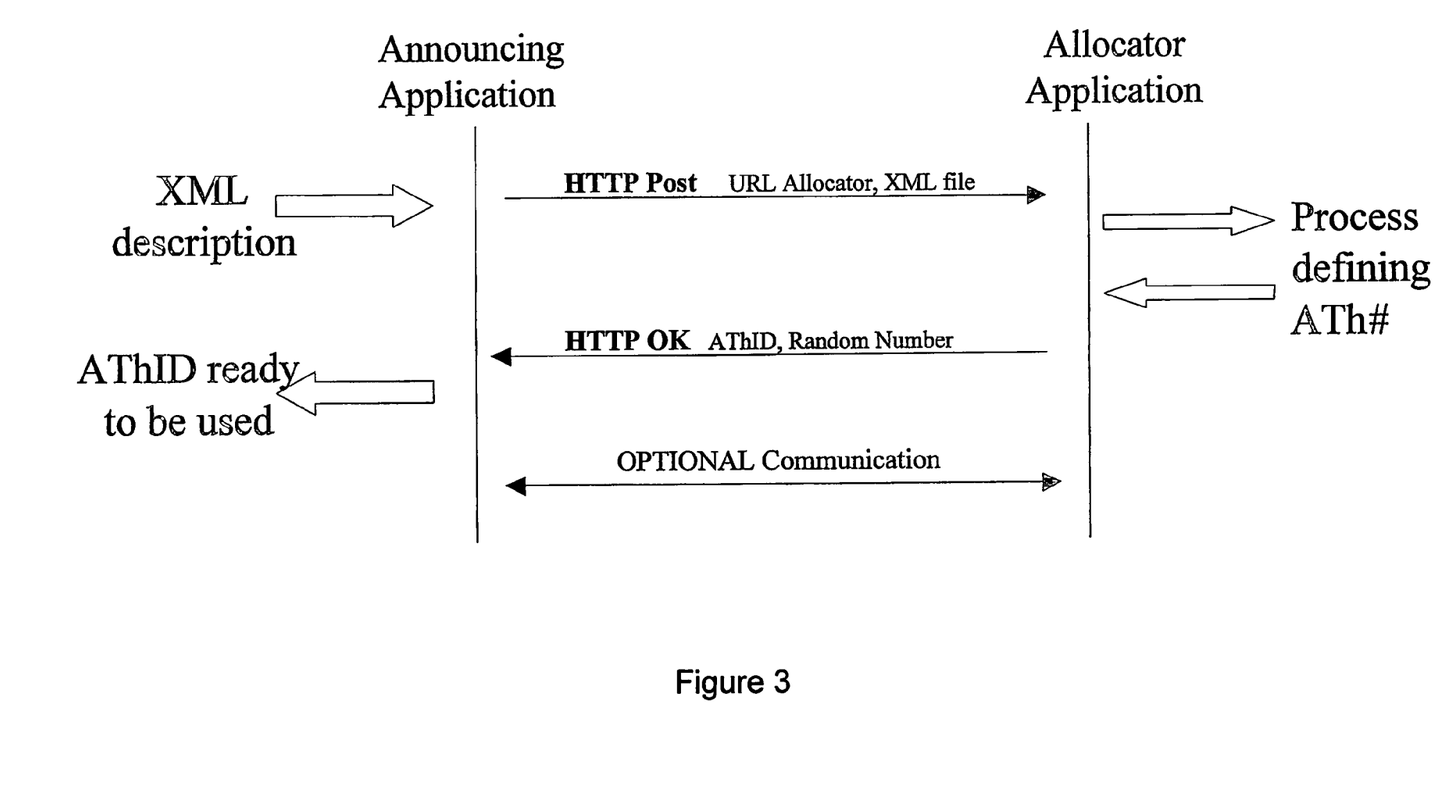
FIG. 3 is a message sequence diagram illustrating the sequence of messages that are transmitted in an embodiment of the invention.

The request from the announcing application 10 to the allocator 20 consists of an HTTP request/reply as illustrated in FIG. 3. The announcing application 10 sends a POST request containing: the URL of the ALLOCATOR, the protocol version and a MIME-like message containing the description of the information to be announced. The server running the allocator program then subsequently responds with a status line, including the message's protocol version and a success or error code, followed by a MIME-like message containing the information of the AThID that has been allocated.

In more detail, the HTTP communication is initiated by a user agent associated with the announcing application 10 and consists of a request to be applied to a resource on some server. The HTTP communication usually takes place over TCP/IP connections. The default port is TCP 80, but other ports can be used. This does not preclude HTTP from being implemented on top of any other protocol on the Internet, or on other networks. HTTP only presumes a reliable transport; any protocol that provides such guarantees can be used. In this design we use HTTP v1.1 but other version could be used.

The POST HTTP method is used to request that the allocator program accepts the entity enclosed in the request as a new subordinate of the request URL in the request line. POST is a HTTP method designed to provide a block of data to a data handling process. If the entity enclosed is passed correctly to the data handling process in the allocator an OK answer is sent back including an entity that describes the AThID.

Figure 4:
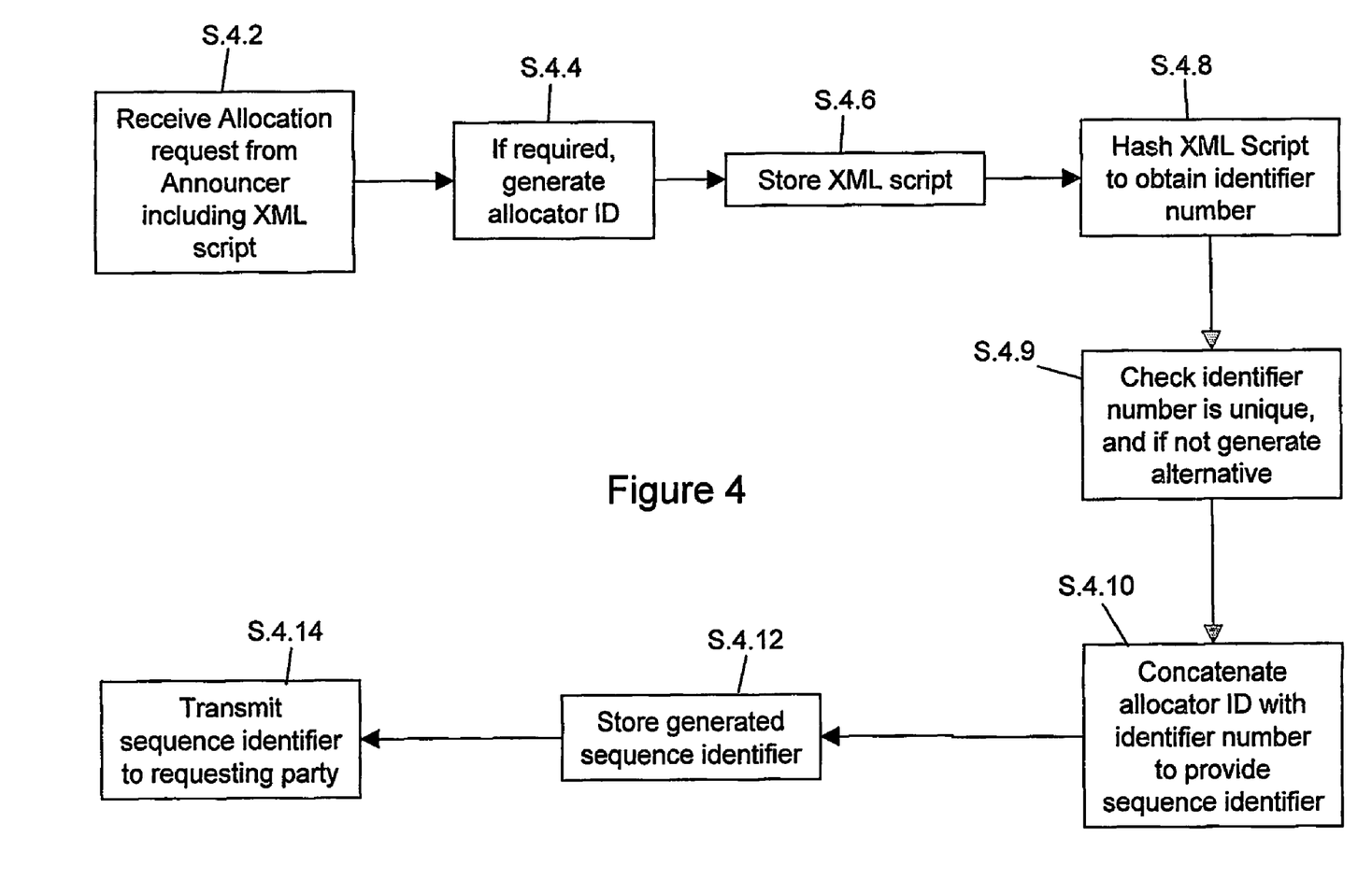
FIG. 4 is a flow diagram illustrating the steps performed by an allocator in the embodiment of the invention.

Upon receipt of the POST request, the allocator 20 then performs the following steps (more precisely, the host computer hosting the allocator program performs the following steps under the control of the program).

Having received the request at step 4.2. the next step (s.4.4) is that, if required, the allocator ID is generated. Usually this step would not be carried out, for the reason that the allocator ID is preferably a pre-defined URL (or email address or IP address, as we describe above). However, in some embodiments both a new allocator ID and an ATh# may be combined to form an AThID, and hence this step is provided as an optional step.

Following step 4.4, at step 4.6 the received XML script which provides the human- and machine-readable description of the subject matter of the announcement thread is stored in a local store 22 provided at the allocator 20. This is so that a record is kept at the allocator of the announcement threads for which an AThID has been issued.

Next, at step 4.8, The allcoator program then hashes the description contained in the XML file and the random number contained in the value field to give the Announcement Thread Number. That is, the ATh# is given as follows:

ATh#=md5(XML <DESCRIPTION>, XML <VALUE>)

As we mentioned above, an ATh# preferably consists of 16 bit, although the preferred hash function is MD5, which gives a 128-bit output. The output of the hash function is therefore truncated to the first 16 bits to obtain the ATh#.

Following the generation of the ATh#, a check is performed next at step 4.9 to check that the generates ATh# is unique in the context of the particular allocator (note that it does not have to be globally unique across all available allocators, but only unique in the context of thr allocator ID with which it will be combined). This check is performed by matching the generated ATh# with previously generated ATh#s, which are stored in the local store 22. If it is determined that in fact the generated ATh# is not unique i.e. the allocator has produced that ATh# before and has combined the ATh# with the same allocator ID which is to be used in the present case, then a different ATh# must be obtained. This is produced by generating a further random number value which is then substituted into the <value> field of the XML script, and the hash function is applied to this modified data to give a further hash value, which is once again truncated to 16-bits. This further ATh# value is then compared to see if it is unique within the given context. This process is repeated until a unique ATh# is obtained.

Having obtained a unique ATh#, next at step 4.10 the whole AThID is generated by concatenating the obtained ATh# with the allocator ID used by the allocator. As we explained previously, the allocator ID is preferably a URL. The concatenation is performed according to the AThID format described previously, and hence an AThID of the form:

"ath:" <Scheme id> "=" <Allocator id> "$" <Announcement thread number> as an ASCII representation, or of the form:

<Scheme id> | <Allocator id> | <Announcement thread number> for a binary representation is obtained.

Having generated the full AThID, at step 4.12 the allocator 20 acts to store the generated AThID in the local store 22. The AThID is stored referenced to the XML description of the announcement thread for which it is generated. As discussed above, the purpose of storing the AThID is to allow a comparison of newly generated AThIDs with previously generated AThIDs.

Finally, at step 4.14 the allocator 20 transmits the generated AThID back to the requesting announcer as part of the OK response to the POST request. The announcer 12 can then use the AThID in any announcement messages belonging to the announcement thread.

We now describe further embodiments which introduce additional functionality to the embodiments described above.

The embodiment described above does not include security requirements. Therefore, in another embodiment the session is initiated using HTTP protocol and the known Security Socket Layer. In such a case the allocator 20 obtains knowledge of the announcer that has requested a new AThID. Exploiting this option the allocator stores the XML file associated with the certificate of the announcing application. This option gives the possibility to the allocator to restrict the allocation of AThIDs to specific announcers.

A further embodiment makes provision for the prevention of Denial of Service (DoS) attacks. A simple DoS attack could prevent the above described embodiments from working properly. A malicious announcer could flood an allocator with different AThID requests. The allocator would in the normal course of operation as described above allocate as many AThIDs as the number of requests. In this scenario the number of useless AThID allocated would be very high reducing the space and the resource for real AThID.

In order to mitigate this attack scenario, in a further embodiment we require that the allocator 20 after sending the HTTP OK does not store the ATHID but instead requests an acknowledgement from the announcer containing the previous and the current random number. If the requested acknowledgement is not received the allocator times out the request. With such a simple method we require the announcer to maintain some computing resource for each AThID request sent, and hence it will not be possible for the announcer to flood the allocator with AThID requests.

In a further embodiment, an announcer could have the ability to allocate a large number of AThIDs to a specific announcing application: in this case the AThIDs could all be regrouped under a specific context (for example a directory in a URL). For commercial reasons it may be important that the user does not specify the specific context, it is the allocator that provides this function. For example an allocated AThID could look like:

<ath:URL=http://www.hosting.org/AThID?set=farm$31425>

In this example the allocator has allocated a specific set of ATh# called "farm" for a specific announcing application.

A more complicated embodiment could provide the feature of creating a set of AThIDs without receiving requests from the announcer. In this case we require the allocator to ask for feedback from the listener population and to aggregate together in a specific set AThIDs that have similar interests. This option could be very useful since it allows the creation of logical structures of different AThIDs based on user experience: in this case based on user feedback. The only information required from the announcer is the XML file that can be used together with user feedback.

Such a scheme could be very useful to allow searching of similar AThIDs without the need to go to the announcing application (for example in a search engine).

We turn now to the issue of how to deregister an existing AThID The process of deregistration is difficult to define. The problem is that an AThID can be used by different applications. Different applications could use the same AThID to exchange particular software updates in different and separate contexts. A single user cannot decide to deregister or delete a specific AThID since it could be used by another application that the user cannot control. However there are requirements to deregister an AThID because it could become obsolete after a certain amount of time.

In order to get around the above problem we propose two methods that allow users to deregister an existing AThID:

i) TIME TO LIVE (TTL). In one embodiment the AThID is associated with a particular time-to-live that is stored on the allocator. This time-to-live information represents a time stamp (date) after which the AThID will be discarded. To avoid an AThID being discarded the allocator needs to receive a refresh message. This refresh message can be transmit by any announcing applications that are using the specific AThID. As soon as the TTL is renewed the allocator can announce such to other announcing applications. If the TTL is not refreshed before the deadline the AThID is silently discarded by the allocator.

ii) Announcing application owns the ATHID. In this embodiment only a specific announcing application can use and manage a particular ATHID. The announcing application can decide when to delete an announcement. The effect of an ATHID discarded does not influence other applications because it is only announced by a specific application.

The implementation of this scheme requires a POST HTTP message containing the parameter of the ATHID to be deleted. It is important that the option to delete an AThID is only allowed when a security scheme in place.

In conclusion, therefore, the addressing scheme we describe is particular efficient in a scenario such as GAP, where an Ath# has to maintain is uniqueness properties within a well-specified Multicast channel, and the full AThID is only used when a collision is present on the channel. Notice here that an address (if needed) can be referred to a particular user/machine but this is not in the requirement.

With regards to the application of the invention to other messaging schemes, large scale messaging scheme usually require that the information is accessible everywhere in the network in an efficient and unique way. The addressing scheme we have described uses a process that allows a stable and unique identifier to be used by different messaging solutions in a seamless manner. The same AThID can be used to address the same information on different platforms and provided by different users.

Our addressing scheme provides two main advantages:

i) The ability for anyone to allocate an AThID using anyone else's allocator, allowing an allocator of suitable stability to be chosen for each thread in question, rather than having to use one in one's own (possibly insufficiently stable) context.; and ii) The ability to generate announcement addresses comprising a generator ID and a preferably random announcement ID, and allowing these two parts to be exploited differently depending on the specific context.

We conclude with an example of a possible commercial use of our addressing scheme.

Here, an organization that is renowned in terms of stability allocates a stable allocator ID to be used for AThIDs. For example, we may imagine a general identifier for software updates for the 3G protocol being provided by a stable organisation such as the IEEE, which allocates a unique identifier for this subject. Thanks to the generated Announcement Thread Number being combined with the allocator ID the resulting AThID is random enough to avoid ownership disputes in the future (characteristic of the classic URL scheme). It is important to notice that the resources of the stable allocator are separated from any other resources when the AThID is used, such that organisations like the IEEE are not discouraged from offering such a service. The service consumes a microscopic resource and never requires them to arbitrate over ownership of names.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An announcement method for use in a publish-subscribe architecture, the method comprising:

a processor compiling an index announcement message based on a plurality of thread identifiers respectively identifying a plurality of announcement threads, wherein each of the plurality of thread identifiers comprises a first and a second sub-part, and transmitting the compiled index announcement message onto an index channel; wherein for each thread identifier, the first sub-part is an identifier which uniquely identifies an allocator which generated the thread identifier and the length of the first sub-part is greater than the length of the corresponding second sub-part, and compiling the index announcement thread further comprises processing the second sub-parts to reduce the size of the index announcement message such that if the second sub-part of any thread-identifier to be included within the index announcement message does not match the second sub-part of any other thread identifier to be included within the index announcement message, then including only the second sub-part and not the corresponding first sub-part of the thread identifier in the compiled index announcement message, otherwise if the second sub-part of any thread identifier to be included within the index announcement message does match the second sub-part of any other thread identifier to be included within the index announcement message, then including both the first and second sub-part in the compiled index announcement message.

2. The method according to claim 1 further comprising:
requesting the allocation of a thread identifier from an allocator; and receiving a message from the allocator containing the requested thread identifier.

3. The method according to claim 1 wherein the index channel corresponds to a predetermined set of thread identifiers.

4. A method according to claim 1 wherein the first sub-part of a thread identifier is a network address or other network locator.

5. The method according to claim 4, wherein the first sub-part is a Universal Resource Locator (URL).

6. The method according to claim 4 wherein the first sub-part is an email address.

7. The method according to claim 4 wherein the first sub-part is an Internet Protocol network address.

8. The method according to claim 1 wherein a second sub-part of a thread identifier is a number.

9. The method according to claim 8 wherein the number is randomly generated.

10. The method according to claim 8 wherein the number is produced by applying a hash function to data defining the subject matter of the thread identifier.

11. The method according to claim 9 wherein for a given first sub-part, if the number generated for the second sub-part has previously been generated, then repeating the random generation.

12. A tangible storage medium containing a computer program or suite of computer programs arranged such that when executed on a computer system it or they cause the computer system to operate in accordance with the method of claim 1.

* * * * *